(12) United States Patent
Doley et al.

(10) Patent No.: US 12,147,946 B2
(45) Date of Patent: Nov. 19, 2024

(54) SYSTEMS AND METHOD FOR PROCESSING DOMAIN SPECIFIC CLAIMS

(71) Applicant: COVERSELF, INC., Lewes, DE (US)

(72) Inventors: Hare Krishna Doley, Bangalore (IN); Raghavendra Pawar, Bengaluru (IN); Rajasekhar Reddy Maddireddy, Bangalore (IN); Neeraj Mallikarjun Bhusare, Nashik (IN)

(73) Assignee: COVERSELF, INC., Lewes, DE (US)

( * ) Notice: Subject to any disclaimer, the term of this patent is extended or adjusted under 35 U.S.C. 154(b) by 0 days.

(21) Appl. No.: 18/280,223

(22) PCT Filed: Sep. 21, 2022

(86) PCT No.: PCT/IB2022/058905
§ 371 (c)(1),
(2) Date: Sep. 2, 2023

(87) PCT Pub. No.: WO2023/047289
PCT Pub. Date: Mar. 30, 2023

(65) Prior Publication Data
US 2024/0037506 A1   Feb. 1, 2024

(30) Foreign Application Priority Data

Sep. 21, 2021   (IN) .............................. 202111042744

(51) Int. Cl.
*G06Q 10/10* (2023.01)
*G06F 40/226* (2020.01)
*G06F 40/274* (2020.01)

(52) U.S. Cl.
CPC ........... *G06Q 10/10* (2013.01); *G06F 40/226* (2020.01); *G06F 40/274* (2020.01)

(58) Field of Classification Search
CPC ..... G06Q 10/10; G06F 40/226; G06F 40/274; G06F 40/211
See application file for complete search history.

(56) References Cited

U.S. PATENT DOCUMENTS 6,188,976 B1   2/2001   Ramaswamy et al.
7,665,063 B1   2/2010   Hofmann et al.
(Continued)

FOREIGN PATENT DOCUMENTS

| KR | 100940308 B1 | 2/2010 |
| WO | 2023047289 A2 | 3/2023 |

OTHER PUBLICATIONS

International Search Report issued Mar. 14, 2023, on a PCT Application No. PCT/IB2022/058905 filed Sep. 21, 2022.
(Continued)

*Primary Examiner* — Florian M Zeender
*Assistant Examiner* — Karma A El-Chanti
(74) *Attorney, Agent, or Firm* — Franklin & Associates International Inc; Matthew F. Lambrinos

(57) ABSTRACT

Systems and method for processing domain specific claims is disclosed. The system comprises a memory, a processor, and a network interface communicatively coupled to the processor and the memory. The memory comprises computer instructions that when executed by the processor cause the system to perform functions. The functions comprise creating domain specific rules in a domain specific language based on domain specific regulations. The functions also comprise converting the created domain specific rules from the domain specific language to a target programming language. Further, the functions comprise accessing the domain specific claims via the network interface or a storage unit. Furthermore, the functions comprise validating the domain specific claims based on the converted domain specific rules respectively. In addition, the functions comprise providing a (Continued)

validation result corresponding to the domain specific claims respectively based on the validation. The method comprises the functions performed by the system(s).

24 Claims, 4 Drawing Sheets

(56) References Cited

U.S. PATENT DOCUMENTS

| | | | |
|---|---|---|---|
| 8,364,469 | B2 | 1/2013 | Neale |
| 8,689,175 | B2 | 4/2014 | Matsumoto |
| 10,102,372 | B2 | 10/2018 | Huang et al. |
| 10,446,268 | B2 | 10/2019 | Webb et al. |
| 10,911,379 | B1* | 2/2021 | Bray ................ H04L 51/18 |
| 2005/0273315 | A1* | 12/2005 | Laitila ............... G06F 40/30 704/9 |
| 2007/0170424 | A1 | 7/2007 | Nishita |
| 2009/0018866 | A1 | 1/2009 | Christen |
| 2009/0254337 | A1 | 10/2009 | Sprecher et al. |
| 2013/0226623 | A1 | 8/2013 | Diana et al. |
| 2013/0332422 | A1 | 12/2013 | Bader et al. |
| 2014/0122377 | A1 | 5/2014 | Goodman et al. |
| 2020/0117575 | A1 | 4/2020 | Prabhu Kholkar et al. |
| 2021/0303516 | A1* | 9/2021 | Pham ................ G06F 16/211 |

OTHER PUBLICATIONS

Ciampaglia et al. "Fact-checking, False Narratives, and Argumentation Schemes." KnOD@ WWW. 2021. Apr. 14, 2021 (Apr. 14, 2021) Retrieved on Jan. 17, 2023 (Jan. 17, 2023) from <http://users.ics.forth.gr/-fafallos/Kn002021/Knod2021_paper_9.pdf> entire document.

IN 202111042744 A (Coverself Inc) Sep. 30, 2022 (Sep. 30, 2022) entire document.

Karmiloff-Smith. "An alternative to domain-general or domain-specific frameworks for theorizing about human evolution and ontogenesis." AIMS Neuroscience 2.2 (2015): 91-104. Jun. 1, 2015 (Jun. 1, 2015) Retrieved on Jan. 17, 2023 (Jan. 17, 2023)from <https://europepmc.org/article/PMC/4678597> entire document.

Written Opinion issued Mar. 14, 2023, on a PCT Application No. PCT/IB2022/058905 filed Sep. 21, 2022.

Jennifer Munnelly, Slobh an Clarke—Title: A Domain-Specific Language for Ubiquitous Healthcare; Date of Publication: Oct. 6, 2008.

Heß, Michael; Kaczmarek, Monika; Frank, Ulrich; Podleska, Lars; and Täger, Georg—Title: A Domain-specific Modelling Language for Clinical Pathways in the Realm of Multi-perspective Hospital Modelling; Date of Publication: May 29, 2015.

David R. Christiansen1, Klaus Grue2, Henning Niss2, Peter Sestoff1, and Kristi_an S. Sigtryggsson2—Title: An Actuarial Programming Language for Life Insurance and Pensions; Date of Publication: May 30, 2013.

David H. Rakison & Yevdokiya Yermolayeva—Title: How to Identify a Domain-general Learning Mechanism When You See One; Date of Publication: May 9, 2011.

* cited by examiner

SYSTEMS AND METHOD FOR PROCESSING DOMAIN SPECIFIC CLAIMS

CROSS-REFERENCE TO RELATED APPLICATIONS

The present application is a national stage of International Application No. PCT/IB2022/058905, filed 21 Sep. 2022 at the International Bureau of the World Intellectual Property Organization, which claims the priority to Indian Patent Application No. 202111042744, filed 21 Sep. 2021 at the Office of the Controller General of Patents, Designs and Trade Marks, India.

FIELD OF INVENTION

The present disclosure relates in general to claims processing. More particularly, the present disclosure relates to systems and method for processing domain-specific claims.

BACKGROUND OF THE INVENTION

Processing claims to check for fraud, abuse, and/or waste (FWA) is an important function for various entities such as, but not limited to, hospitals and/or insurance companies. However, processing the claims to detect the FWA is generally complex and cumbersome process that requires detailed clinical analysis of the claims over millions of scenarios in view of the governing regulations which may be difficult for a human to remember and/or verify in a timely fashion. The volume of such claims, particularly in countries like the US, are to a tune of hundreds of million lines per month. Each claim consists of many individual line items which need to be verified independently and together as well. Such specific functions or responsibilities in claim processing of verifying incorrect claims and/or payments, apart from health policy wordings, clauses, and/or coverage checks, lie with subject matter experts (SME) who manually enter the scenarios to be validated before processing the claims. Such scenarios are technically called as domain specific rules. Such a process of manually configuring domain specific rules by the SME(s) is cumbersome, time consuming, and requires technical/domain knowledge. The domain specific rules, thus configured, cannot be shared internally between the SME(s) and hence, not interoperable resulting in repetition of work by the SME(s).

US20140122377A1 discloses a system and a method for applying a business rule management system ("BRMS") to a customer relationship management ("CRM") system to create, test, and/or publish a business rule in the CRM system. A business rule editor utilizes template business domain specific rules constructed from domain-specific language and/or terminology and/or natural language and/or syntax. A business rule tester may test the business rule to ensure the business rule does not provide unintended results. A business rule publisher may publish the business rule into a production environment.

SUMMARY OF THE INVENTION

In an aspect of the present disclosure, a system for processing one or more domain specific claims is disclosed. The system comprises a memory, one or more processing units, and a network interface communicatively coupled to one or more processing units and the memory. The memory comprises computer instructions that when executed by the one or more processing units cause the system to perform one or more functions. The functions comprise creating one or more domain specific rules in a domain specific language based on one or more domain specific regulations. The functions also comprise converting the created domain specific rules from the domain specific language to a general programming language. Further, the functions comprise accessing the domain specific claims via the network interface or a storage unit. Furthermore, the functions comprise validating the domain specific claims based on the converted domain specific rules respectively. In addition, the functions comprise providing a validation result corresponding to the domain specific claims respectively based on the validation.

In another aspect of the present disclosure, a system for processing one or more domain specific claims is disclosed. The system comprises a memory, one or more processing units, and a network interface communicatively coupled to one or more processing units and the memory. The memory comprises computer instructions that when executed by the one or more processing units cause the system to perform one or more functions. The functions comprise creating one or more domain specific rules in a domain specific language based on one or more domain specific regulations. The functions also comprise converting the created domain specific rules from the domain specific language to a general programming language. Further, the functions comprise providing the converted domain specific rules to a claim server via a network. The claim server validates the domain specific claims based on the converted domain specific rules.

In yet another aspect of the present disclosure, a claim processing system for processing one or more domain specific claims is disclosed. The claim processing system comprises a rule server and a claim server. The rule server is configured to create one or more domain specific rules in a domain specific language based on one or more domain specific regulations. The rule server is also configured to convert the domain specific rules created from the domain specific language to a general programming language. The claim server is configured to receive the domain specific claims and validate the domain specific claims respectively based on the converted domain specific rules of the rule server. The claim server is also configured to provide a validation result corresponding to the domain specific claims respectively based on the validation.

In yet another aspect of the present disclosure, a method for processing one or more domain specific claims is disclosed. The method comprises a step of creating one or more domain specific rules in a domain specific language based on one or more domain specific regulations. The method also comprises a step of converting the created domain specific rules from the domain specific language to a general programming language. Further, method comprises a step of accessing the domain specific claims via the network interface or a storage unit. Furthermore, the method comprises a step of validating the domain specific claims based on the converted domain specific rules respectively. In addition, method comprises a step of providing a validation result corresponding to the domain specific claims respectively based on the validation.

DETAILED DESCRIPTION

Figure 1:
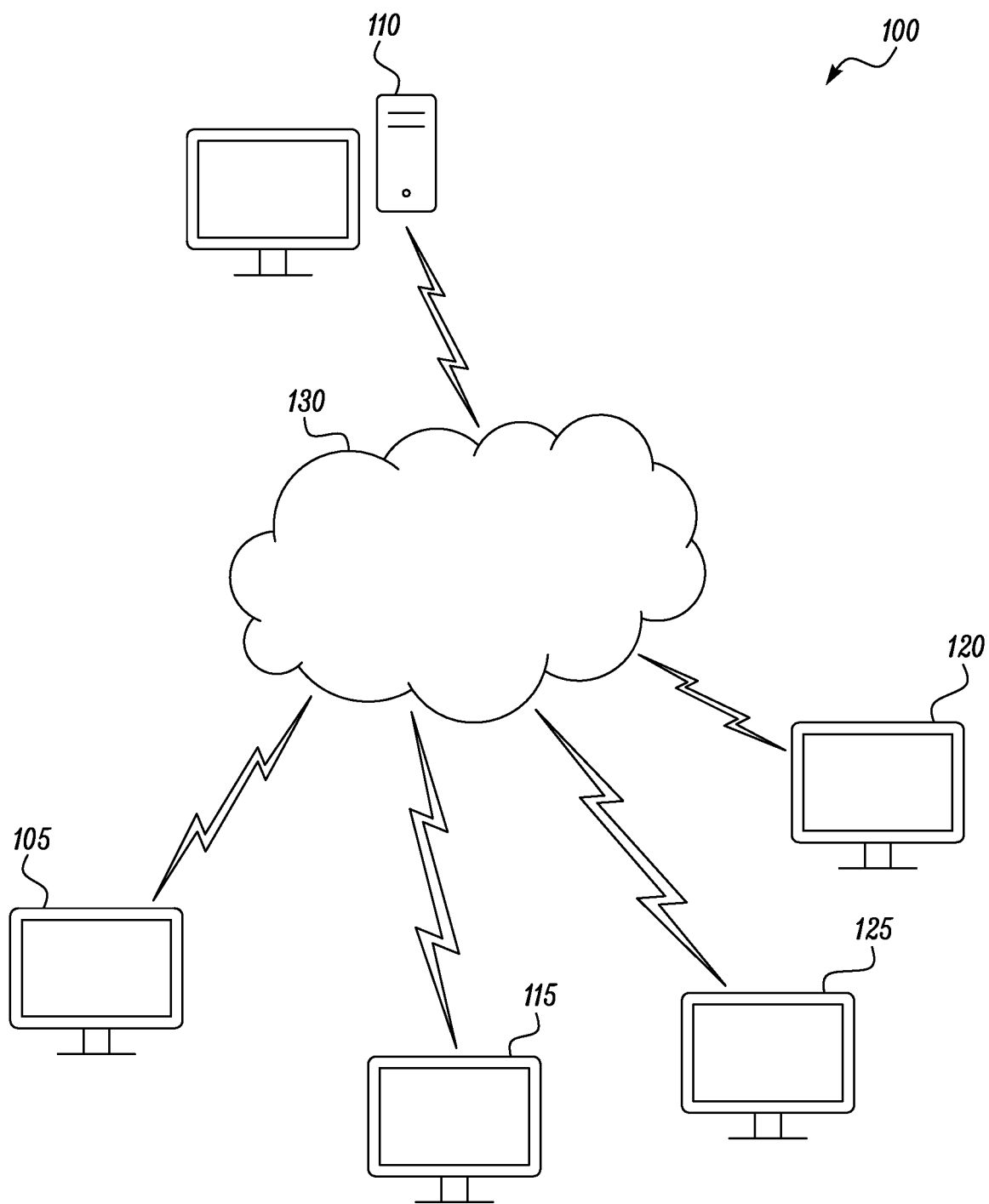
FIG. 1 is a schematic block diagram of a claim processing system comprising a rule creation device, a rule server, claim servers, and a client device in accordance with which various embodiments of the present disclosure may be implemented.

Referring to FIG. 1, a schematic illustration of a claim processing system 100 for processing one or more domain specific claims is disclosed. The claim processing system 100 comprises a rule creation device 105, a rule server 110, claim servers 115-120, and a client device 125 interconnected via a network 130. Examples of the rule creation device 105, the rule server 110, the claim servers 115-120, and the client device 125 include, but are not limited to, computers, laptops, mobile devices, handheld devices, personal digital assistants (PDAs), tablet personal computers, digital notebook, automatic teller machines (ATMs), wearables, cloud servers, and similar electronic devices. The network 130 may include communication networks such as, but not limited to, a Local Area Network (LAN), a Wireless Local Area Network (WLAN), a Wide Area Network (WAN), internet and a Small Area Network (SAN). In some embodiments, the network 130 may correspond to telecom networks using EDGE/GPRS/3G/4G/5G technologies.

The rule server 110 may facilitate creation of one or more domain specific rules via the rule creation device 105 in a domain-specific language (DSL) based on one or more domain specific regulations. In an embodiment, the rule creation device 105 may also be incorporated in the rule server 110. The domain specific regulations may be pre-defined by a governing entity/body associated with a specific domain. Examples of the domain include, but not limited to, medical and/or healthcare, insurance, and human resources. The domain specific regulations may correspond to regulations that need to be adhered to in order to process the domain specific claims. In an embodiment, the domain specific regulations may predefine fraud, waste, and/or abuse (FWA) of the domain specific items/claims. Examples of the domain specific regulations associated with the healthcare domain include, but are not limited to, Medicare and Medicaid programs in the United States. In an embodiment, the rule server 110 may access the domain specific regulations via the network 130 from one or more online or offline data sources. Examples of the online data sources include, but are not limited to, websites, databases, and servers comprising the domain specific regulations. Examples of the offline data sources include, but are not limited to, physical documents, papers, journals, and reports comprising the domain specific regulations. In an embodiment, the rule server 110 may receive or retrieve the domain specific regulations from the data sources. In an embodiment, the rule server 110 may also access the domain specific regulations without receiving or retrieving the domain specific regulations from the data sources, for example, via an Application Programming Interface (API) associated with the data sources and/or facilitated by the governing bodies associated with the domain. In an embodiment, the rule server 110 may store the domain specific regulations. The rule server 110 may also be configured to interpret the domain specific regulations. In an embodiment, the rule server 110 may apply a model such as, but not limited to, a natural language processing (NLP) model to interpret the domain specific regulations. In an embodiment, the rule server 110 may apply Intelligent Character Recognition (ICR) or Optical Character Recognition (OCR) methods and/or techniques to interpret the domain specific regulations received from the offline data sources. The rule server 110 may identify one or more domain specific parameters and corresponding parameter values associated with the domain specific parameters based on the interpretation. The rule server 110 may also incorporate the domain specific parameters and the corresponding parameter values in one or more conditionals based on the interpretation and the identification in order to create the domain specific rules. In an embodiment, the rule server 110 may apply a model such as, but not limited to, a machine learning model, to identify the domain specific parameters and the corresponding parameter values associated with the domain specific parameters, incorporate the domain specific parameters and the corresponding parameter values in the conditionals based on the interpretation and the identification automatically.

In an embodiment, the rule creation device 105 may provide a web-editor accessible via a web browser and/or a web application that facilitates the creation of the domain specific rules. In an embodiment, the rule creation device 105 may provide a standalone web application in an operating system (OS) environment of the rule creation device 105 that facilitates the creation of the domain specific rules. The rule creation device 105 may enable inputting one or more conditionals via one or more input means in order to create the domain specific rules in the DSL. Examples of the conditionals include, but are not limited to, "if . . . then . . . else" statements, functions, loops and/or other programming statements or constructs. The conditionals may also include conditional operators and/or Boolean operators such as, but not limited to, "and", "or", "greater than", "less than", and "equal to". In an embodiment, the conditional operators and/or the Boolean operators may be symbolic or literal. In an embodiment, the domain specific parameters, format of the parameter values, the conditions, the programming statements, and/or programming constructs may be predefined in the DSL. The conditionals and/or the programming statements or constructs may collectively be referred to as a "syntax" of the DSL. Accordingly, the rule creation device 105 may facilitate the rule creation using the DSL syntax. The rule creation device 105 may facilitate use of the DSL syntax together with domain-specific parameters and corresponding parameter values as enabled, designed, provided, and/or predefined by the DSL in order to create the domain specific rules. Accordingly, in an embodiment, the domain specific rules may comprise the domain specific parameters, the parameter values, and the conditionals. Examples of the domain-specific parameters predefined in the DSL for the healthcare domain include, but are not limited to, "procedure", "principalProcedure", "diagnosis", "service", "primaryDiagnosis", "secondaryDiagnosis", "specialty", "claimType", and "claimCount". The parameter values may comprise, but are not limited to, numeric values or codes, alphanumeric values or codes, and/or symbolic values or codes. Particularly, the parameter values for the healthcare domain may include, but are not limited to, medical procedure codes, service codes, positive or negative numeral values, claim identifiers or codes, and institution codes. In an embodiment, the parameter values or codes may correspond to domain specific identifiers associated with domain specific items such as, but not limited to, products, services, treatments, tests, and/or investigations.

In an embodiment, the rule server 110 may validate the DSL syntax, the domain specific parameters, the parameter values, and/or the domain specific rules during the creation of the domain specific rules in the DSL using the rule creation device 105 in real-time. The rule server 110 may further support the creation of domain specific rules via the rule creation device 105 by providing content assistance for the programming language constructs provided and/or pre-defined by the DSL, auto-fixing errors or highlighting errors in the domain specific rules created or being created in real-time, validating the DSL syntax in the domain specific rules created or being created in real-time, providing contextual help to create the domain specific rules, and/or highlighting DSL syntax for explanation and/or for use. In an embodiment, in order to validate the domain specific rules created or being created in real-time, the rule server 110 may determine a programming logic associated with the domain specific rules created using the rule creation device 105 based on the DSL syntax, the domain specific parameters, and/or the parameter values. In an embodiment, the programming logic may define a logic for executing the domain specific rules created in the DSL and may comprise computer instructions to execute the domain specific rules based on the logic.

The rule server 110 may also facilitate testing of the domain specific rules created for accuracy and execution intent. The execution intent refers to expected result from a particular domain specific rule being implemented or executed. In an embodiment, the execution intent corresponding to the domain specific rules may be predefined in the rule server 110. In an embodiment, the execution intent may be provided to the rule server 110 via one or more input means. The rule server 110 may also facilitate using and/or importing test data or test claims from one or more online or offline data sources in order to test the domain specific rules via the rule creation device 105. The offline data sources may include, but are not limited to, data files or documents stored in the rule creation device 105 and/or the rule server 110. The online data sources may include, but are not limited to, data stored on servers and/or accessible via the Internet and/or the network 130. In an embodiment, the rule server 110 may first validate the domain specific rules created in the DSL by parsing the domain specific rules and determining the programming logic associated with the domain specific rules. The rule server 110 may then apply the programming logic associated with the domain specific rules to the test data/claims and provide a validation result corresponding to the domain specific rules respectively back to the rule creation device 105. Thereby, the rule server 110 facilitates verification of the execution intent of the domain specific rules with reference to the test data/claims via the rule creation device 105 and helps check if the validation results are similar to or match with the expected results or the execution intent further to the implementation of the domain specific rules created using the test data/claims. In an embodiment, the test data or claims may comprise randomized and/or a range of test parameter values and the rule server 110 may incorporate the test parameter values in the domain specific rules created or being created in real-time in order to validate the domain specific rules.

The rule creation device 105 may also facilitate selecting a target programming language in which the domain specific rules, thus created and/or tested, are to be converted or transpiled. In an embodiment, the target programming language may be a general programming language. Examples of the target programming language include, but are not limited to, server-side scripts or languages such as JAVA and/or Python, or database languages such as Structured Query Language (SQL). The rule server 110 may receive the programming language selected using the rule creation device 105 and facilitate the conversion or transpiling of the domain specific rules created in the DSL into the target programming language. In an embodiment, the rules server 110 may store the converted domain specific rules. In an embodiment, the rule server 110 may receive or retrieve the domain specific claims from the claim servers 115-120. In an embodiment, the rule server 110 may provide the API to access the domain specific rules to the claim servers 115-120 in order to receive domain specific claims from the claim servers 115-120. In an embodiment, the rule server 110 may also access the domain specific claims stored in the claim servers 115-120 without receiving or retrieving the domain specific claims. The rule server 110 may then validate the domain specific claims respectively based on the converted domain specific rules. The rule server 110 may also provide a validation result corresponding to the domain specific claims respectively to the claim servers 115-120. In an embodiment, the claim servers 115-120 may in turn provide the validation result received from the rule server 110 to the client device 125.

In an embodiment, the rule server 110 may also provide the converted domain specific rules in the target programming language to the claim servers 115-120. For example, the claim server 115 may be a server-side claim server such as a JAVA claim server that implements JAVA as the target programming language. Accordingly, the rule server 110 may provide the converted and/or stored domain specific rules in the JAVA programming language to the server-side claim server 115 via the network 130. In an embodiment, the rule creation device 105 may enable pushing the converted domain specific rules for deployment to the claim servers 115-120 via the rule server 110 and the network 130. Similarly, in another example, the claim server 120 may be a database claim server such as an SQL server. Accordingly, the rule server 110 may provide the converted domain specific rules in SQL programming language to the database claim server via the network 130. The rule creation device 105 may also enable the converted domain specific rules in the SQL programming language to be pushed or deployed to the database claim server via the network 130.

In an embodiment, the rule server 110 may also generate an executable file comprising the converted domain specific rules. In an embodiment, the rule server 110 may compile the converted or transpiled domain specific rules into an executable code or format in order to generate the executable file. The rule server 110 may also provide the compiled domain specific rules in the executable format to the rule creation device 105 and/or store the compiled domain specific rules in the executable format in a binary repository. Examples of the binary repository include, but are not limited to, Artifactory or Nexus, and GitLab. Such binary repositories can be stored and versioned in a system such that different computer applications may download the binary repositories as dependencies. In an embodiment, the rule server 110 may store the complied domain specific rules in the executable format as one or more software packages such as, but not limited to, maven jar (for JAVA), npm packages, pypi packages (for Python), and .deb files, in the binary repository. The rule server 110 may also provide the executable file comprising the converted domain specific rules to the claim servers 115-120. In an embodiment, the rule creation device 105 may enable pushing the compiled domain specific rules in the executable format for deployment to the claim servers 115-120 via the rule server 110 and the network 130. In an embodiment, the rule creation device 105 may enable pushing the compiled domain specific rules in the executable format to a preferred claim server of the claim servers 115-120 based on a software architecture or type of a rule engine implemented at the preferred claim server in order to validate the domain specific claims. In an exemplary example, the claim server 115 may be a server-side claim server such as the JAVA claim server that implements JAVA as the target programming language. Accordingly, the rule server 110 may provide the executable file or the compiled domain specific rules in the JAVA executable format to the server-side claim server 115 via the network 130. The rule creation device 105 may enable pushing the executable file or the compiled domain specific rules in the JAVA executable format to the server-side claim server 115 via the network 130. The server-side claim server may implement a JAVA rule engine and accordingly, execute the executable file or the compiled domain specific rules in JAVA executable format received via the rule server 110 in order to process the domain specific claims. Similarly, in another example, the claim server 120 may be a database claim server such as the SQL server. Accordingly, the rule server 110 may deploy the executable file or the compiled domain specific rules in SQL executable format to the database claim server via the network 130. The rule creation device 105 may also enable the executable file or the compiled domain specific rules in the SQL executable format to be pushed or deployed to the database claim server via the network 130. The database claim server may implement an SQL rule engine and accordingly, execute the executable file or the compiled domain specific rules in the SQL executable format received via the rule server 110 in order to process the domain specific claims.

In an embodiment, the client device 125 may provide the domain specific claims to the claim server, for example, 115 for processing via the network 130. In an embodiment, the domain specific claims may also be inputted manually into the claim servers 115-120 via one or more input means. The claim servers 115-120 may store and/or validate the domain specific claims received from the client device 125 or inputted manually by using the converted domain specific rules or executing the compiled domain specific rules in the executable format received from the rule server 110. The domain specific claims may comprise one or more parameter values corresponding to the domain specific parameters. The parameter values may comprise, but are not limited to, a quantity, a frequency, and a timing associated with the domain specific parameters. The claim servers 115-120 may also be configured to provide a validation result corresponding to the domain specific claims respectively to the client device 125 and/or on a user interface based on the validation. In an embodiment, the client device 125 may provide the domain specific claims to the rule server 110 for processing via the network 130 and the rule server 110 may validate the domain specific claims based on the converted domain specific rules. In an embodiment, the claim server, for example, 115 may provide the domain specific claims stored in claim server 115 or received from the client device 125 to the rule server 110 for processing via the network 130 and the rule server 110 may validate the domain specific claims based on the converted domain specific rules. In an embodiment, the rule server 110 may retrieve or access the domain specific claims from the claim server, for example, 115 and validate the domain specific claims based on the converted domain specific rules respectively. In an embodiment, the claim servers 115-120 may validate the domain specific claims based on the converted domain specific rules or the compiled domain specific rules in the executable format received from the rule server 110. The rule server 110 may also provide the validation result corresponding to the domain specific claims respectively to the claim server, for example, 115 and/or the client device 125 based on the validation. In an embodiment, the rule server 110 may present the validation result on the user interface provided on the claim server, for example, 115, the rule server 110, and/or the client device 125.

Figure 2:
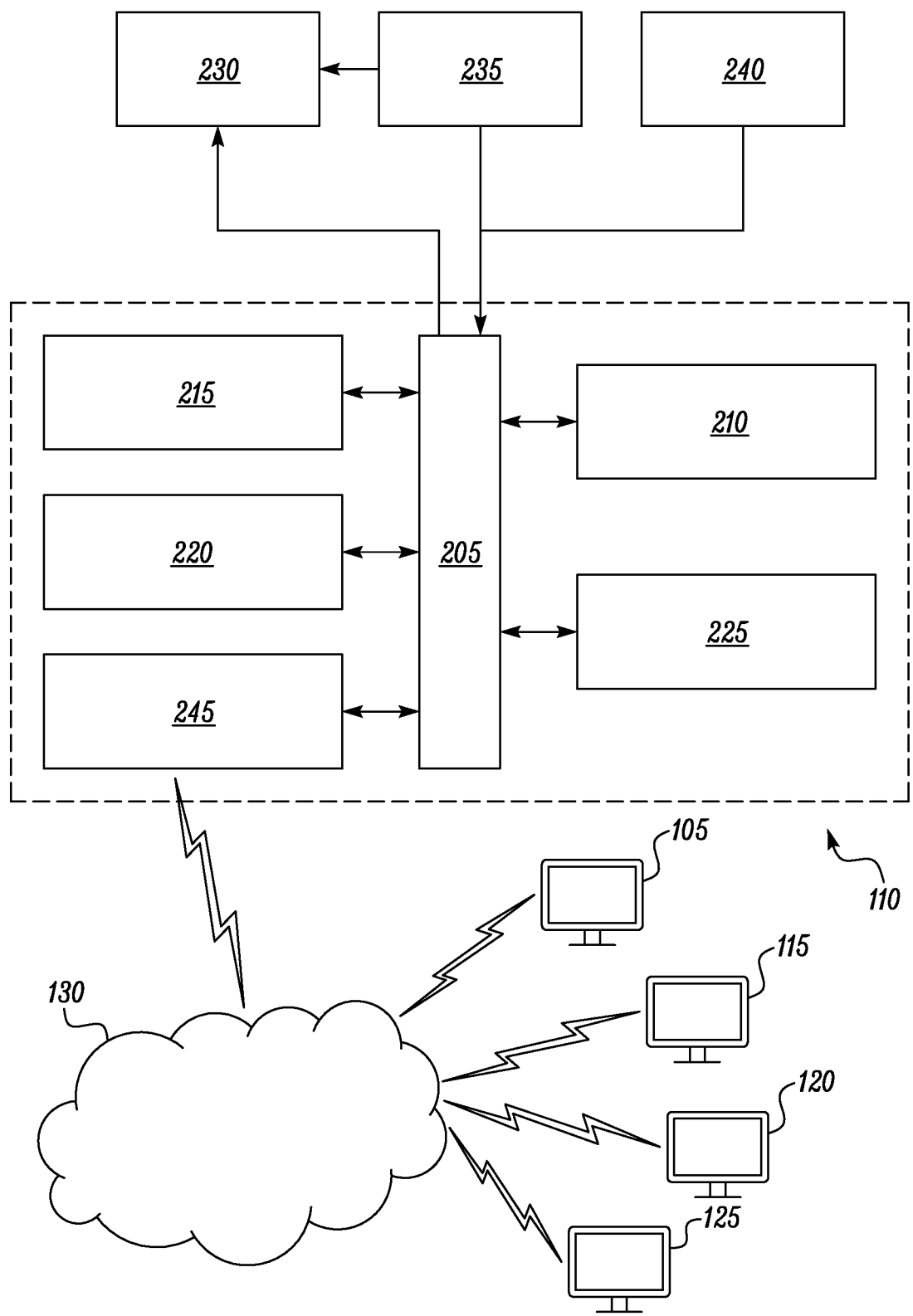
FIG. 2 is a schematic block diagram of the rule server of FIG. 1, in accordance with the embodiment of the present disclosure.

Referring to FIG. 2, a block diagram of the rule server 110 of FIG. 1 that facilitates processing of the domain specific claims is disclosed. In some embodiments, the rule server 110 includes a bus 205 or other communication mechanism for communicating information, and a processor 210 coupled with the bus 205 for processing information. The rule server 110 also includes a memory 215, such as a random-access memory (RAM) or other dynamic storage device, coupled to the bus 205 for storing information and instructions to be executed by the processor 210. The memory 215 can be used for storing temporary variables or other intermediate information during execution of instructions to be executed by the processor 210. The rule server 110 further includes a read only memory (ROM) 220 or other static storage device coupled to the bus 205 for storing static information and instructions for processor 210. A storage unit 225, such as a magnetic disk, optical disk, solid state or semiconductor memory, is provided and coupled to the bus 205. The storage unit 225 may store DSL related information such as, but limited to, DSL syntax, DSL architecture, DSL configuration files, DSL related executables and/or other files for embedded scripting languages such as, but not limited to, JavaScript (js), Lua, Groovy, R, SQL, Python, and Excel VBA. The storage unit 225 may also store domain specific rules, test claims, domain specific claims, and domain specific regulations. Further, the storage unit 225 may also store one or more machine learning models and/or other models, such as, but not limited to, NLP models, and OCR/ICR related models. The rule server 110 can be coupled via the bus 205 to a display 230, such as a cathode ray tube (CRT), liquid crystal display (LCD), Light Emitting Diode (LED), and Organic LED (OLED), for displaying information to the user. An input device 235, including alphanumeric and other keys, is coupled to bus 205 for communicating information and command selections to the processor 210. Another type of user input device is a cursor control 240, such as a mouse, a trackball, or cursor direction keys for communicating direction information and command selections to the processor 210 and for controlling cursor movement on the display 230. The input device 235 can also be included in the display 230, for example a touch screen.

Various embodiments are related to the use of rule server 110 for implementing the techniques described herein. In one embodiment, the techniques are performed by the rule server 110 in response to the processor 210 executing instructions included in the memory 215. Such instructions can be read into the memory 215 from another machine-readable medium, such as the storage unit 225. Execution of the instructions included in the memory 215 causes the processor 210 to perform the process steps described herein.

The term "machine-readable medium" as used herein refers to any medium that participates in providing data that causes a machine to operate in a specific fashion. In some embodiments implemented using the rule server 110, various machine-readable media are involved, for example, in providing instructions to the processor 210 for execution. The machine-readable medium can be a storage media.

Storage media includes both non-volatile media and volatile media. Non-volatile media includes, for example, optical or magnetic disks, such as storage unit 225. Volatile media includes dynamic memory, such as the memory 215. All such media must be tangible to enable the instructions carried by the media to be detected by a physical mechanism that reads the instructions into a machine.

Common forms of machine-readable medium include, for example, a floppy disk, a flexible disk, hard disk, magnetic tape, or any other magnetic medium, a CD-ROM, any other optical medium, punch cards, paper-tape, any other physical medium with patterns of holes, a RAM, a PROM, and EPROM, a FLASH-EPROM, any other memory chip or cartridge.

In another embodiment, the machine-readable medium can be a transmission media including coaxial cables, copper wire and fibre optics, including the wires that comprise the bus 205. Transmission media can also take the form of acoustic or light waves, such as those generated during radio-wave and infra-red data communications. Examples of machine-readable medium may include but are not limited to a carrier wave as describer hereinafter or any other medium from which the rule server 110 can read, for example online software, download links, installation links, and online links. For example, the instructions can initially be carried on a magnetic disk of a remote computer. The remote computer can load the instructions into its dynamic memory and provide the instructions over a telephone line using a modem. A modem local to the rule server 110 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on storage unit 225 either before or after execution by the processor 210. All such media must be tangible to enable the instructions carried by the media to be detected by a physical mechanism that reads the instructions into a machine.

The rule server 110 also includes a network interface 245 coupled to the bus 205. The network interface 245 provides a two-way data communication coupling to the network 130. For example, the network interface 245 can be an integrated service digital network (ISDN) card or a modem to provide a data communication connection to a corresponding type of telephone line. As another example, the network interface 245 can be a local area network (LAN) card to provide a data communication connection to a compatible LAN. Wireless links can also be implemented. In any such implementation, the network interface 245 sends and receives electrical, electromagnetic, or optical signals that carry digital data streams representing various types of information.

Figure 3:
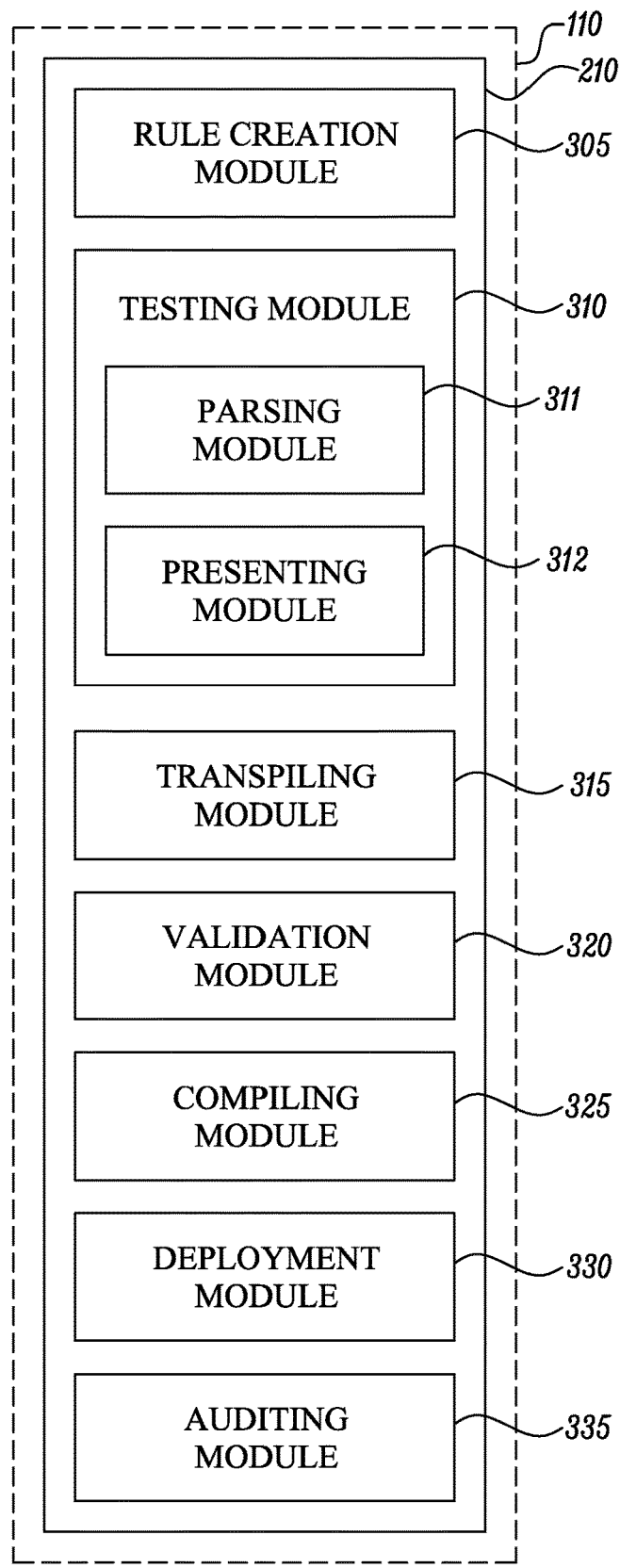
FIG. 3 is a schematic block diagram of one or more modules in a processor of the rule server of FIG. 2, in accordance with the embodiment of the present disclosure.

In some embodiments, the processor 210 of the rule server 110 may be capable of executing the computer instructions in order to perform one or more functions. In an embodiment, the processor 210 may be configured to execute one or more modules 305-330, as shown in FIG. 3, in order to perform the functions. The processor 210 includes hardware circuitry that facilitates the execution of the modules 305-335. The modules 305-335 may include, but are not limited to, a rule creation module 305, a testing module 310, a transpiling module 315, a validation module 320, a compiling module 325, a deployment module 330, and an auditing module 335.

Referring to FIGS. 2-3, the rule creation module 305 may facilitate creation of the domain specific rules in a domain-specific language (DSL) based on the domain specific regulations. In an embodiment, the rule creation module 305 may access the domain specific regulations via the network interface 245 and the network 130 or via the storage unit 225. For example, the rule creation module 305 may receive or retrieve the domain specific regulations via one or more online or offline data sources. In an embodiment, the rule creation module 305 may access the domain specific regulations via the network 130 without receiving or retrieving the domain specific regulations. The rule creation module 305 may be configured to store and/or interpret the domain specific regulations. In an embodiment, the rule creation module 305 may be configured to apply one or more models such as, but not limited to, the NLP models and/or the OCR/ICR methods, techniques, and/or related models in order to interpret the domain specific regulations. The rule creation module 305 may also identify one or more domain specific parameters and corresponding parameter values associated with the domain specific parameters to be used based on the interpretation. The rule creation module 305 may then incorporate the domain specific parameters and the corresponding parameter values in one or more conditionals based on the interpretation and the identification in order to create the domain specific rules. In an embodiment, the rule creation module 305 may apply a machine learning model to interpret the domain specific regulations, identify the domain specific parameters and the corresponding parameter values, and incorporate the domain specific parameters and the corresponding parameter values in the conditionals based on the interpretation and the identification automatically.

In an embodiment, the rule creation module 305 may also provide a user interface on the display 230 and/or on the rule creation device 105 in order to create the domain specific rules in the DSL. In an embodiment, the rule creation module 305 may provide the user interface as a web-editor or a web application that is accessible via the display 230 and/or the rule creation device 105 via the network 130. In an embodiment, the rule creation module 305 may receive the domain specific rules created or being created in real-time via the user interface provided on the display 230 via the bus 205 and/or the rule creation device 105 via the network 130 in real-time. The rule creation module 305 may define a DSL format for the creation of the domain specific rules in the DSL. The DSL format may define use of the DSL syntax comprising the conditionals, such as "if . . . then . . . else" statements, functions, loops and/or other programming statements or constructs in order to create the domain specific rules in the DSL. The DSL format may also define use of the domain-specific parameters, the corresponding parameter values, and/or programming operators such as conditional and/or Boolean operators to be used in conjunction with the DSL syntax as provided and/or predefined by the DSL in order to create the domain specific rules. The DSL format may also define use of additional programming constructs to import files and/or procure additional data or facts from external sources. In addition, the DSL format may define use of additional programming constructs to incorporate metadata associated with the domain specific rules. Examples of the metadata include, but are not limited to, the domain specific codes associated with the domain specific claims, priority of the rule and/or type of the domain specific claims to be evaluated such that the domain specific rules may be filtered based on the metadata. The DSL format may also define use of commented sections corresponding to the domain specific rules such that the commented sections describe the domain specific rule created or being created. Accordingly, the rule creation module 305 may facilitate the creation of the domain specific rules via the user interface using the DSL syntax and in the DSL format. An exemplary rule created in the DSL format is described in Example 1 below:

Example 1

```
/* If a service is billed with a female only procedure, then deny the service/Episode
with reason, 09 */
claim Type "IP"
executionOrder "1000"
if primaryDiagnosis is "A111" or principalProcedure in tag("femaleProcedures")
and gender is MALE
then
deny ("09", "This is a female only service")
```

Referring to Example 1, the commented section "/* If a service is billed with a female only procedure, then deny the service/Episode with reason, 09 */" describes the domain specific rule created or being created. The programming construct "claimType" defines a type of the claim to be evaluated. The programming construct "executionOrder" defines the priority of the domain specific rule or an order of execution of the domain specific rule when multiple domain specific rules are required to be executed and/or evaluated. The conditionals "if . . . then . . . " are used in the conjunction with domain-specific parameters "primaryDiagnosis", "principalProcedure", "gender" and "deny" having corresponding parameter values "A111", "femaleProcedures", "MALE", and "09" respectively. The programming construct "tag" facilitates importing files and/or procure additional data or facts from an external source or a file that is titled "femaleProcedures". The external file titled "femaleProcedures" may comprise on or more parameter values that are associated with 'female procedures' that may be used as the parameter values corresponding to the domain specific parameter "principalProcedure" in the domain specific rule as shown in Example 1 above. The DSL format may define other such programming constructs such as "table" and/or "codesets" to facilitate the importing of files and/or procuring the additional data or facts from the external sources. In an embodiment the external source or file may be stored in the storage unit 225 of the rule server 110. In an embodiment, the external source or file may be stored on different servers and may be accessible to the rule server 110 via the network 130. In an embodiment, the external source or file may be stored in the rule creation device 105. In an embodiment, the external source or file may be stored on different servers and may be accessible to the rule creation device 105 via the network 130. For instances when the external source or file is stored in the rule creation device 105 and/or the different sources, the rule creation module 305 may be configured to store the additional data or facts procured from the external sources in the storage unit 225. In an embodiment, the rule creation module 305 may also provide automatic completion of the additional data or datasets procured upon receiving relevant programming construct input via the user interface.

Another exemplary example of a domain specific rule created in the DSL format is described in Examples 2 and 3 below:

Example 2 if allowedAmount>avg(allowedAmount) then alert ("bill inflation", "999")

Example 3 if allowedAmount<"$400" and providerGroup is "XYZ Provider Group" then alert ("XYZ alert", "666")

Referring to Examples 2 and 3, the exemplary domain specific rules created in the DSL format include programming operators such as, less than denoted by "<", greater than denoted by ">", and "and".

Another exemplary domain specific rule created in the DSL format is described in Example 4 below:

Example 4

```
if
    claimsCount > avg(claimCount)
    and
    time Window is "8 Hours"
    and
    specialty is "Physiotherapy"
then deny("", "")
```

Referring to Example 4, the exemplary domain specific rule created in the DSL format includes statistical functions such as "avg" for average. The domain specific rules created in the DSL format may also facilitate use of other such statistical functions such as "min" for minimum, "max" for maximum", "median" in order to create the domain specific rules. The exemplary rule created in the DSL format as described in Example 4 may be implemented for processing domain specific claims in real-time via aggregation and filtering of the claims based on the exemplary rule.

In an embodiment, the rule creation module 305 may also facilitate the creation of domain specific rules based on pre-defined templates that may be automatically included in the user interface via interactive user interface features such as drag-and-drop and/or other such visual selection or input means. Accordingly, the rule creation module 305 may also facilitate the creation of domain specific rules in the DSL format without manually inputting the DSL syntax, the domain-specific parameters and corresponding parameter values and/or the programming operators.

In an embodiment, rule creation module 305 may also be configured to automatically generate the domain specific rules in the DSL format based on the execution intent of the domain specific rule or rule related information as specified by a user via the user interface provided on the display 230 and/or the rule creation device 105. In an embodiment, the execution intents may also be predefined and/or stored in the storage unit 225. In an embodiment, the execution intent and/or the rule related information may be specified in a natural language format via the user interface and the rule creation module 305 may be configured to perform semantic and/or contextual analysis of the execution intent and/or the rule related information in order to automatically generate the domain specific rule in the DSL format. In an embodiment, the rule creation module 305 may automatically determine the DSL syntax, the domain-specific parameters and corresponding parameter values, and the programming constructs required that enable the execution intent to be met based on the rule related information provided by the user via the user interface. In an embodiment, the rule creation module 305 may implement one or more machine learning models to perform the semantic and/or contextual analysis of the execution intent and/or the rule related information.

In an embodiment, the rule creation module 305 may also implement one or more machine learning modules to automatically assign the priority of the domain specific rule and/or the order of execution of the rule when multiple domain specific rules are created in the DSL format and when the multiple domain specific rules are to be tested and/or executed on the claim servers 115-120 (see FIG. 1) to process the domain specific claims. In an embodiment, the rule creation module 305 may automatically assign the priority of the domain specific rule and/or the order of execution of the domain specific rule when the priority of the domain specific rule and/or the order of execution of the domain specific rule has not been manually assigned in the domain specific rule created.

In an embodiment, the testing module 310 may facilitate testing of the domain specific rules created for accuracy and execution intent of the domain specific rules created or are being created in real-time. In an embodiment, the testing module 310 may receive the domain specific rules created or being created in real-time in the DSL format via the user interface provided on the display 230 and/or the rule creation device 105 via the network 130. The testing module 310 may include a parsing module 311 and a presenting module 312.

The parsing module 311 may parse the domain specific rules created or being created in real-time based on a set of rules or grammar defined in the DSL. In an embodiment, the parsing module 311 may be configured to validate the DSL format incorporated to create the domain specific rules. The parsing module 311 may also support the creation of domain specific rules by providing content assistance for the programming language constructs provided by the DSL, auto-fixing errors or highlighting errors in the domain specific rules created or being created in real-time, validating the DSL syntax in domain specific rules created or being created in real-time, providing contextual help to create the domain specific rules, and/or highlighting DSL syntax for explanation and/or for use. For example, in an embodiment, the parsing module 311 may provide prompts, explanations, or reference documents in order to provide content assistance in inputting the DSL syntax, the domain-specific parameters and/or the parameter values. In an embodiment, the parsing module 311 may also provide automatic completion of the DSL syntax, the domain-specific parameters and/or the parameter values on the user interface based on the input received via the display 230 and/or from the rule creation device 105 via the network 130. In an embodiment, the parsing module 311 may provide content assistance, perform automatic completion, contextual help, and/or other such functions based on the set of domain specific rules or grammar defined for the DSL using a parser generator such as, but not limited to, Xtext/Antlr. In some embodiment, the parsing module 311 may also depend on one or more external Application Program Interfaces (APIs) in order to perform the above stated functions.

In an embodiment, the parsing module 311 may also be configured to validate the domain specific rules created or being created in real-time. Particularly, the parsing module 311 may be configured to determine and apply programming logic corresponding to the domain specific rules created or being created in real-time to test data or test claims provided manually and/or from the external sources or files in order to validate the domain specific rules created. For example, in the Example 1 as described above, the parsing module 311 may parse the rule as created in Example 1 using the external source or file "femaleProcedures" and apply the programming logic to check if the domain-specific parameter "gender" has a parameter value "MALE" or "FEMALE" in an external dataset file comprising procedure and gender types in the test claims in order to validate the domain specific rule created or being created. The external dataset file may be manually provided, pre-stored in the storage unit 225 and/or pre-stored in the rule creation device 105. In an embodiment, the parsing module 311 may receive a validation request via the user interface provided on the display 230 and/or the rule creation device 105 in order to validate the domain specific rules.

In an embodiment, the parsing module 311 may also be configured to automatically generate multiple test values in the test claims corresponding to the domain-specific parameters identified in the domain specific rules based on the parsing in order to test the domain specific rules created or being created in real-time. Examples of the test values include, but are not limited to, medical procedure codes, service codes, positive or negative numeral values, claim identifiers or codes, and institution codes. In an embodiment, the parsing module 311 may implement one or more machine learning modules to automatically generate the test values corresponding to the domain-specific parameters. The parsing module 311 may then validate the test claims based the domain specific rules created or being created in real-time. In an embodiment, the parsing module 311 may apply the programming logic to execute and test the domain specific rules to verify accuracy and the execution intent based on the automatically generated test values in the test claims. In an embodiment, the parsing module 311 may generate test results corresponding to the test claims respectively based on the parsing and the validation. In an embodiment, the parsing module 311 may compare the test result corresponding to the test claims respectively with the execution intent associated with the test claims respectively. In an embodiment, the parsing module 311 may modify the domain specific rules created or being created in real-time in the DSL based on the domain specific regulations and based on the comparison. In an embodiment, the parsing module 311 may determine a match between the test result and at least one of the execution intents associated with the test claims respectively based on the comparison.

The presenting module 312 may be configured to provide test results based on the parsing and validation by the parsing module 311. In an embodiment, the presenting module 312 may display the test results on the user interface provided on the display 230 and/or the rule creation device 105 via the network 130. The test results may include an approval or rejection of a domain specific claim based on the domain specific rule created. For example, with reference to Example 1 described above, the presenting module 312 may display the test results stating that all domain specific claims with procedures similar to those included in file "femaleProcedures" and gender types having a value "MALE" in the external dataset file are rejected. Thus, the parsing module 311 and the presenting module 312 together facilitate verification of the execution intent of the domain specific rules with reference to the test data and help check if the test results obtained are similar to the expected results further to the validation of the domain specific rules.

In an embodiment, the parsing module 311 may also enable the domain specific rules created in the DSL format to be stored in the rule creation device 105 as a DSL file type. In an embodiment, the parsing module 311 may store the created domain specific rules in the DSL file type. In an embodiment, upon selection and/or execution of the DSL file type in the rule server 110 and/or rule creation device 105, the presenting module 312 may be configured to display the user interface including the created domain specific rules in the DSL format. In an embodiment, the parsing module 311 may also enable storing the DSL file type in the storage unit 225 of the rule server 110. In an embodiment, the presenting module 312 may also be configured to display the stored DSL file type by the parsing module 311 via the user interface. The presenting module 312 may then display the created domain specific rules in the DSL format on the user interface in response to a selection and/or execution of the DSL file type via the user interface. In an embodiment, the parsing module 311 may facilitate comparison between two DSL files in order identify duplicated or similar domain specific rules, and/or provide alerts, notifications, and/or alternative suggestions for rule creation via the user interface.

In an embodiment, the parsing module 311 may also be configured to facilitate a semantic and/or a contextual search, an execution intent-based search and/or search based on a scope of the domain specific rule to locate the domain specific rules created and stored as the DSL file types in the storage unit 225 of the rule server 110 or the rule creation device 105. In an embodiment, the parsing module 311 may be configured to index the different domain-specific parameters and corresponding parameter values identified in the parsed domain specific rules and create semantic indices for each parsed rule in order to facilitate the search. The parsing module 311 may also be configured to ascertain the execution intent of the parsed domain specific rules to facilitate the search. In an embodiment, the parsing module 311 may implement one or more machine learning modules to ascertain the execution intent of the parsed domain specific rules.

In an embodiment, the parsing module 311 may also be configured to store multiple versions of the domain specific rules created. In an embodiment, the parsing module 311 may be configured to store multiple versions of the domain specific rules created in the DSL file type. The multiple versions may include one or more modifications made to the domain specific rules created via the rule creation module 305. Accordingly, parsing module 311 may also be configured to parse and identify the modifications made to the domain specific rules in the DSL format. The presentation module 312 may be configured to display the multiple versions of the domain specific rules and identify differences between the multiple versions of the domain specific rules created and/or stored. In an embodiment, the parsing module 311 may also create and store an index of different inter-relationships between the different domain specific rules created. In an embodiment, the parsing module 311 may then establish parent and child relationships between the domain specific rules created based on the index, programming constructs, and/or semantic analysis performed using the machine learning models by the parsing module 311.

In an embodiment, the testing module 310 may also be configured to collect and accumulate various statistics across a run or a session involving the parsing of the domain specific rules created or being created in real-time by the parsing module 311. In an embodiment, the presenting module 312 may be configured to display statistics across the runs and/or average of a set of runs via the user interface provided on the display 230 and/or the rule creation device 105.

The transpiling module 315 may be configured to convert or transpile the domain specific rules created in the DSL into a target programming language. The transpiling module 315 may comprise a translate compiler (TRANSPILER) that converts a source code of the domain specific rules created in the DSL into the source code of the target programming language. In an embodiment, the transpiling module 315 may receive a conversion request via the user interface provided the display 230 and/or the rule creation device 105 to convert the domain specific rules created from the DSL to the target programming language. In an embodiment, the transpiling module 315 may also receive a selection of the target programming language via the user interface. In an embodiment, the transpiling module 315 may convert or transpile the domain specific rules in the DSL format to a server-side programming language such as, but not limited to, JAVA and/or Python. In an embodiment, transpiling module 315 may convert or transpile the domain specific rules in the DSL format to a database programming language such as, but not limited to, SQL. In an embodiment, the transpiling module 315 may then convert the created and/or modified domain specific rules from the DSL to the target programming language based on the determination that the test results corresponding to the test claims satisfy or match the corresponding execution intents respectively. In an embodiment, the target programming language may be pre-defined by the claim server, for example, 115.

In an embodiment, the validation module 320 may validate the domain specific claims received, retrieved, or accessed via the network interface 245 or the storage unit 225 based on the created or converted domain specific rules. In an embodiment, the validation module 320 may validate the domain specific claims received, retrieved, or accessed via the rule creation device 105, the claim servers 115-120, and/or the client device 125. In an embodiment, the validation module 320 may receive a validation request via the user interface provided on the display 230, the rule creation device 105, the claim servers 115-120, and/or the client device 125 to validate the domain specific claims. In an embodiment, the validation module 320 may receive a validation request via the user interface provided on the claim server, for example, 115 or the client device 125 to validate the domain specific claims. In an embodiment, the validation module 320 may receive or retrieve the domain specific claims provided in the claim server, for example, the claim server 115 via the network 130 and the network interface 245. In an embodiment, the validation module 320 may provide an API to access the created or converted domain specific rules to the claim servers 115-120 in order to receive domain specific claims from the claim servers 115-120. The claim servers 115-120 may place an API request using the API provided by the validation module 320 to provide the domain specific claims to the validation module 320. The API request may include the domain specific parameters and the corresponding parameter values associated with the domain specific parameters. In an embodiment, the validation module 320 may also access the domain specific claims provided in the claim server, for example, 115, via the network 130 and the network interface 245 without retrieving or receiving the domain specific claims from the claim server, for example, 115. The validation module 320 may then validate the domain specific claims based on the created or converted domain specific rules respectively. In an embodiment, the validation module 320 may identify a particular domain specific rule among the created or converted domain specific rules corresponding to a particular domain specific claim received, retrieved, and/or accessed via the storage unit 225 or the network interface 245. In an embodiment, the validation module 320 may trigger the particular domain specific rule identified and execute the particular domain specific rule corresponding the particular domain specific claim. In an embodiment, the validation module 320 may identify and/or trigger multiple created or converted domain specific rules corresponding to the particular domain specific claim. Conversely, the validation module 320 may also identify and/or trigger the particular domain specific rules corresponding to multiple domain specific claims. In an embodiment, the validation module 320 may determine the domain specific parameters and/or the corresponding parameter values associated with the domain specific parameters in the domain specific claims. The validation module 320 may identify the particular domain specific rule or the multiple domain specific rules corresponding to the particular domain specific claim based on the determination. In an embodiment, the validation module 320 may incorporate the parameter values determined corresponding to the domain specific parameters in the particular domain specific rule or the multiple domain specific rules identified in order to validate the particular domain specific claim. In an embodiment, the domain specific claims provided in the claim server, for example, 115 may be accessible in the target programming language. In an embodiment, the claim server, for example, 115 may receive the domain specific claims from the client device 125 and may in turn provide the received domain specific claims to the validation module 320. In an embodiment, the validation module 320 may provide a validation result corresponding to the domain specific claims respectively to the claim server, for example, 115. In an embodiment, the validation module 320 may be configured to detect a fraud, an abuse, and/or a waste (FWA) in the domain specific claims based on the validation result respectively. In an embodiment, the FWA may be predefined in the domain specific regulations. In an embodiment, the validation module 320 may provide an alert corresponding to the domain specific claims or the validation result based on the detection. In an embodiment, the validation module 320 may receive a request to modify or include one or more exceptions to at least one of the created or converted domain specific rules via the network interface 245 or one or more input means, for example, the input device 235. In an embodiment, the validation module 320 may modify the created or converted domain specific rules in the domain specific language based on the request. Further, the validation module 320 may be configured to validate the domain specific claims based on the modified domain specific rules. In an embodiment, the validation module 320 may be configured to compare the validation result corresponding to the domain specific claims respectively with the execution intents associated with the domain specific rules. The validation module 320 may modify the domain specific rules created in the DSL or converted in the target programming language based on the domain specific regulations and based on the comparison. The validation module 320 may also be configured to determine a match between the validation result and at least one of the execution intents based on the comparison. In an embodiment, the validation module 320 may be configured to convert the created and/or modified domain specific rules from the DSL to the target programming language based on the determination.

The compiling module 325 may generate an executable file comprising the converted domain specific rules. Particularly, the compiling module 325 may compile the converted or transpiled domain specific rules obtained from the transpiling module 315 into an executable code, file, and/or format. In an embodiment, the functions performed by the compiling module 325 may be optional. In an embodiment, the compiling module 325 may also be configured to provide the executable file or the compiled domain specific rules in the executable format to the rule creation device 105. In an embodiment, the compiling module 325 may also store the compiled domain specific rules in the executable format in the storage unit 225 and/or a binary repository such as, but are not limited to, "maven jar" for JAVA, "npm "packages, "pypi" packages of Python, .deb file such that different computer applications and or rule engines may download and/or use the binary repositories as dependencies.

In an embodiment, the deployment module 330 may be configured to provide the converted domain specific rules to the claim servers 115-120 via the network 130. In an embodiment, the deployment module 330 may also be configured to provide the executable file to the claim servers 115-120 via the network 130. Particularly, the deployment module 330 may provide or deploy the compiled domain specific rules in the executable format to the claim servers 115-120 via the network 130. In an embodiment, the deployment module 330 may receive a push for deployment to a preferred claim server of the claim servers 115-120 via the user interface provided on the display 230 and/or from the rule creation device 105 via the network 130. In an embodiment, the claim server 115 may be a server-side claim server such as a JAVA claim server that runs a JAVA rule engine. Accordingly, the deployment module 330 may provide the converted domain specific rules in JAVA programming language or the compiled domain specific rules in a JAVA executable file or format such as, the "mavenjar file" or "jar" file to the server-side claim server 115 via the network 130. The server-side claim server may implement a JAVA rule engine in which the converted domain specific rules in JAVA may be imported or used or the jar file received from the deployment module 330 may be embedded. The JAVA rule engine may then use the converted domain specific rules or execute the domain specific rules present in the jar file in order to process the domain specific claims. Similarly, in an embodiment, the claim server 120 may be a database claim server such as an SQL server. Accordingly, the deployment module 330 may provide the converted domain specific rules in SQL programming language or compiled domain specific claims in an SQL executable file or format to the database claim server via the network 130. The database claim server may implement an SQL rule engine in which the converted or compiled domain specific rules are imported, used, or embedded. The SQL rule engine may then execute the domain specific rules in SQL programming language or the embedded SQL format in order to process the domain specific claims. In an embodiment, the database claim server may include a target claims database (not shown) that may comprise a list of claims to be validated based on the converted or complied domain specific rules. Accordingly, the SQL rule engine of the database claim server may be configured to execute the domain specific rules in SQL corresponding to the list of claims in the target claims database. In an embodiment, the client device 125 may provide the domain specific claims to the claim servers 115-120 for processing via the network 130. The claim servers 115-120 may process the domain specific claims received from the client device 125 by executing and/or using the converted, complied, and/or embedded domain specific rules obtained from the deployment module 330 and validate the domain specific claims. The claim servers 115-120 may then provide a validation result of the domain specific claims based on the validation respectively. In an embodiment, the claim servers 115-120 may provide the validation result on the display 230 and/or to the client device 125. In an embodiment, the claim servers 115-120 may process the domain specific claims received from the client device 125 in real-time.

In an embodiment, the client device 125 may also include an SQL rule engine and the deployment module 330 may be configured to provide the converted or compiled domain specific rules in SQL directly to the client device 125 via the network 130. Accordingly, the client device 125 may be configured to execute the converted or compiled domain specific rules in SQL corresponding to the domain specific claims inputted or stored in the client device 125 respectively.

The auditing module 335 may receive processing and/or validation related information from the rule server 110 or claim servers 115-120. The auditing module 335 may be configured to audit the processing and/or validation related information based on the one or more machine learning models stored in the storage unit 225. In an embodiment, the auditing module 335 may be configured to identify periodic Key Performance Indicators (KPI) associated with the processed claims from the processing and/or validation related information. In an embodiment, the auditing module 335 may also be configured to identify variation or anomaly in approval or denial rates against the averages or threshold approval rates. The auditing module 335 may also be configured to present alerts, prompts, warnings, notifications, and/or recommendations related to the KPI(s), variations, and/or anomalies identified on the user interface, such as the web editor, provided on the display 230 and/or the rule creation device 105 via the network 130. In an embodiment, the auditing module 335 may also be configured to automatically reconfigure the converted or compiled domain specific rules based on the KPI(s) and/or the variation or anomalies identified. In an embodiment, the auditing module 335 may be configured to redeploy the reconfigured domain specific rules to the claim servers 115-120 via the network 130. In an embodiment, the auditing module 335 may also be configured to assess, using the machine learning models, if domain specific rules corresponding to the domain specific claims have been triggered and/or executed accurately from the processing and/or validation related information. In an embodiment, the auditing module 335 may identify and suggest plausible domain specific claims with real-world implications that may have unintentionally and/or wrongly triggered a specific domain specific rule that was inappropriate for the plausible domain specific claims. The auditing module 335 may also present the identified plausible domain specific claims on a user interface provided on the display 230 and/or the rule creation device 105. In an embodiment, the auditing module 335 may also identify, suggest, and/or rectify errors in the DSL syntax and/or the DSL format used in erroneous domain specific rules identified based on the assessment of the processing and/or validation related information. The erroneous domain specific rules may be domain specific rules that may not have been triggered as required or triggered wrongly during the processing of the domain specific claims. In an embodiment, the auditing module 335 may also identify patterns in the processing and/or validation related information that may indicate errors or wrongful processing of the domain specific claims. Further, the auditing module 335 may also automatically configure, test, suggest, and/or present one or more new domain specific rules that may address and/or fix the errors in processing the domain specific claims. For example, the auditing module 335 may identify that particular domain specific claims may have been wrongly accepted or rejected based on the domain specific rules and accordingly, configure new domain specific rules to rectify the errors in processing the particular domain specific claims. Accordingly, in an embodiment, the auditing module 335 may also automatically generate and recommend alternate domain specific rules and/or rectified domain specific rules via the user interface or replace existing domain specific rules created or converted with the alternate or rectified domain specific rules based on the machine learning models. In an embodiment, the auditing module 335 may recommend or replace the alternate or rectified domain specific rules for instances when the execution of the domain specific rules does not satisfy the execution intent of the domain specific rules or when there are any errors in the DSL format of the domain specific rules that may have caused the domain specific rule to be not executed during claim processing by the claim servers 115-120. In an embodiment, the auditing module 335 may also be configured to implement the machine learning models to automatically test the alternate or rectified domain specific rules generated and verify the execution intent of the domain specific rules based on and/or using the processing and/or validation related information.

It may be appreciated that the various modules 305-335 of the rule server 110 may also be incorporated in the rule creation device 105, the claim servers 115-120 and/or the client device 125 to perform the various functions of the modules 305-335.

INDUSTRIAL APPLICABILITY

Figure 4:
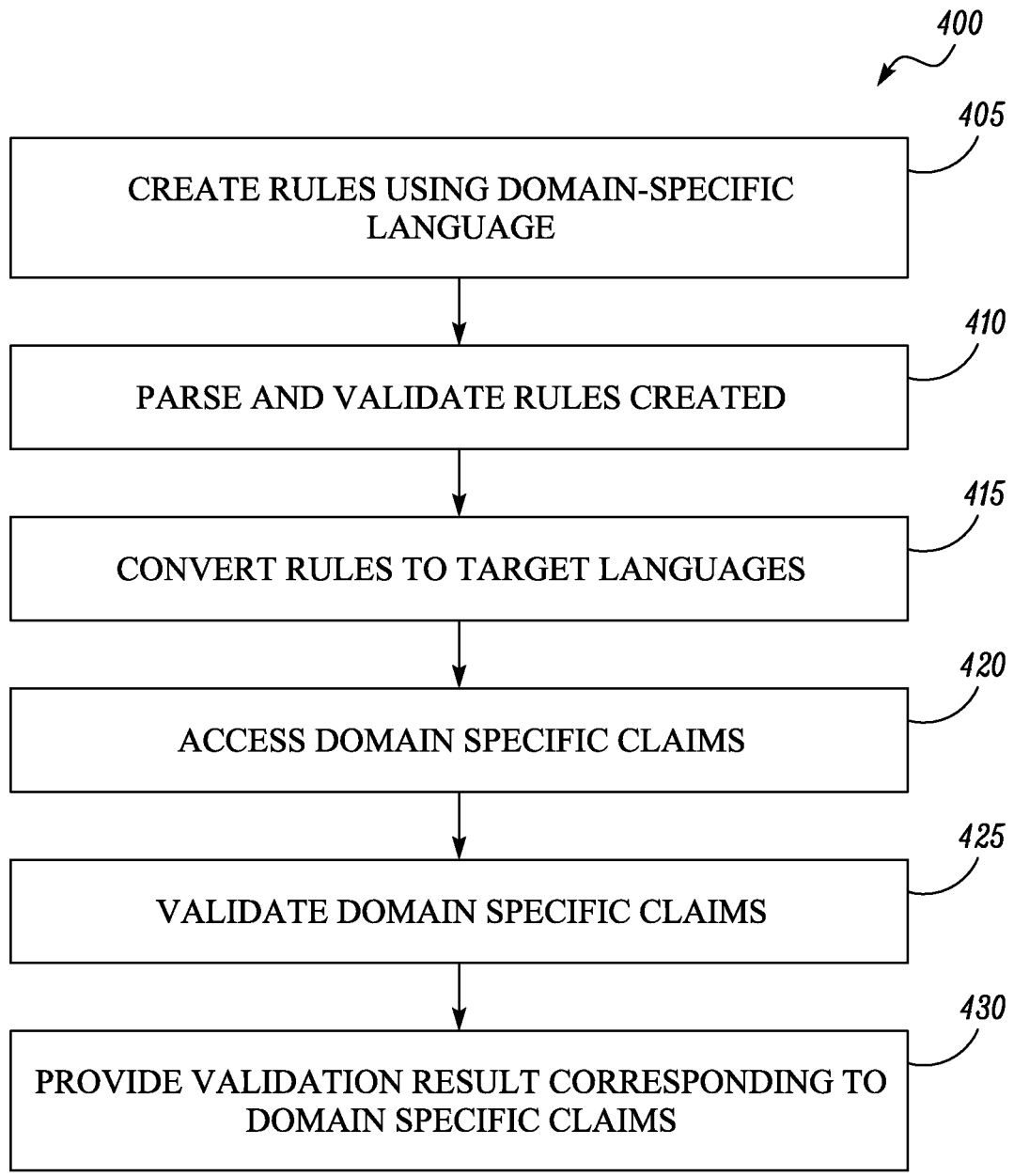
FIG. 4 is an exemplary flow diagram of a method for processing domain specific claims, in accordance with the embodiment of the present disclosure.

Referring to FIG. 4, a method 400 for processing domain specific claims via the rule server 110 of FIGS. 1-2 is disclosed. The method 400 comprises a step 405 of facilitating, via the processor 210 of the rule server 110, creation of domain specific rules in a domain-specific language (DSL) based on domain regulations. The method 400 also comprises a step 410 of parsing and/or validating, via the processor 210, the domain specific rules created. Further, the method 400 comprises a step 415 of converting or transpiling, via the processor 210, the domain specific rules created to target programming languages. In addition, the method 400 comprises a step 420 of accessing, via the processor 210, the domain specific claims via the network interface 245 and the network 130 or the storage unit 225. The method 400 also comprises a step 425 of validating, via the processor 210, the domain specific claims based on the created or converted domain specific rules respectively. Furthermore, the method 400 comprises a step 430 of providing, via the processor 210, validation results corresponding to the domain specific claims respectively based on the validation.

Accordingly, the rule server 110 and the method 400 of the present disclosure facilitate configuration of the domain specific rules using the DSL that incorporates known domain-specific parameters or terminologies used in a particular domain. For example, in the healthcare domain, when a health claim is submitted to an insurance company by the hospital, the hospital must fill a claim form as defined by regulatory authorities. Such claim forms have different clinical, demographical, and/or hospital or regulatory details to be entered. The rule server 110 and the method 400 of the present disclosure facilitate rule configuration using the domain specific parameters or terminologies used in claim fields of such claim forms. Thus, the rule server 110 and the method 400 of the present disclosure facilitate rule configuration without requiring technical know-how of programming and/or spending time selecting the domain specific rules. Further, the rule server 110 and the method 400 of the present disclosure facilitate interoperability such that the domain specific rules created may be shared, exchanged, tested for veracity and execution intent. The domain specific rules created may also be deployed in different programming languages and accordingly, in different execution environments based on end-user/client/server requirements. The rule server 110 and the method 400 of the present disclosure also facilitate running the domain specific rules as a binary on an operating system and/or as a query on databases without requiring any changes in rule configuration. Accordingly, the rule server 110 and the method 400 of the present disclosure also facilitate conversion or transpiling the domain specific rules to different present and/or future target programming languages without changing the intent or logic of the domain specific rules. Furthermore, the rule server 110 and the method 400 of the present disclosure may help in detecting the FWA in the domain specific claims and thereby, help entities such as hospitals and insurance companies adhere to the domain specific regulations and identify misuse of the domain specific claims.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in a restrictive sense. All such possible modifications are intended to be included within the scope of present disclosure.

We claim:

1. A system for processing one or more domain specific claims, comprising:
   a memory;
   a network interface communicatively coupled to one or more processing units and the memory, wherein the memory comprises computer instructions that when executed by the one or more processing units cause the system to perform one or more functions, the one or more functions comprising:
   creating one or more domain specific rules in a domain specific language based on one or more domain specific regulations;
   converting the one or more domain specific rules created from the domain specific language to a target programming language, wherein a selection of the target programming language from a plurality of target programming languages is received via a user interface for the conversion of the one or more domain specific rules;
   accessing the one or more domain specific claims via the network interface or a storage unit;
   validating the one or more domain specific claims based on the one or more converted domain specific rules respectively; and
   providing a validation result corresponding to the one or more claims respectively based on the validation.

2. The system of claim 1, wherein the one or more domain specific rules comprise one or more domain specific parameters, one or more parameter values associated with the domain specific parameters, and one or more conditionals associated with the one or more domain specific parameters and the one or more parameter values, the one or more domain specific parameters, the one or more parameter values, and the one or more conditionals being predefined in the domain specific language.

3. The system of claim 2, wherein the one or more functions comprise:
   accessing the one or more domain specific regulations via the network interface or a storage unit;
   interpreting the one or more domain specific regulations;
   identifying the one or more domain specific parameters and the one or more parameter values associated with the domain specific parameters based on the interpretation;
   incorporating the one or more domain specific parameters and the one or more parameter values in the one or more conditionals based on the interpretation and the identification in order to create the one or more domain specific rules.

4. The system of claim 3, wherein the one or more functions comprise:
   applying a model to interpret the one or more domain specific regulations, identify the one or more domain specific parameters and one or more codes associated with the domain specific parameters, incorporate the one or more domain specific parameters and the one or more parameter values in the one or more conditionals based on the interpretation and the identification automatically.

5. The system of claim 1, wherein the one or more domain specific claims are provided in a claim server and are accessible in the target programming language, the target programming language being predefined by the claim server.

6. The system of claim 1, wherein the accessing comprises:
   receiving the one or more domain specific claims provided in a claim server via a network and the network interface;
   retrieving the one or more domain specific claims provided in the claim server via the network and the network interface; or
   accessing the one or more domain specific claims provided in the claim server via the network and the network interface without retrieving or receiving the one or more domain specific claims from the claim server.

7. The system of claim 6, wherein the one or more functions comprise:
   comparing the validation result corresponding to the one or more domain specific claims respectively with one or more execution intents;
   modifying the one or more domain specific rules created in the domain specific language based on the one or more domain specific regulations based on the comparison.

8. The system of claim 7, wherein the one or more functions comprise:

determining a match between the validation result and at least one of the one or more execution intents based on the comparison; and converting the one or more created or modified domain specific rules from the domain specific language to the target programming language based on the determination.

9. The system of claim 7, wherein the creating of the one or more domain specific rules is based on the one or more execution intents.

10. The system of claim 1, wherein the one or more functions comprise:

accessing one or more test claims via the network interface or a storage unit;

validating the one or more test claims based on the one or more domain specific rules created respectively; and providing a test result corresponding to the one or more test claims respectively based on the validation.

11. The system of claim 10, wherein the one or more functions comprise:

comparing the test result corresponding to the one or more test claims respectively with one or more execution intents;

modifying the one or more domain specific rules created in the domain specific language based on the one or more domain specific regulations based on the comparison.

12. The system of claim 1, wherein the one or more functions comprise:

detecting a fraud, an abuse, and/or a waste in the one or more domain specific claims based on the validation result respectively, wherein the fraud, the abuse, and/or the waste are predefined in the one or more domain specific regulations; and providing an alert corresponding to the one or more domain specific claims or the validation result based on the detection.

13. The system of claim 1, wherein the one or more functions comprise:

receiving a request to modify or include one or more exceptions to at least one of the one or more converted domain specific rules via the network interface or one or more input means; and modifying the one or more domain specific rules in the domain specific language based on the request.

14. The system of claim 1, wherein the one or more functions comprise:

providing a user interface to at least one of create the one or more domain specific rules, validate the one or more domain specific rules created, convert the one or more domain specific rules created from the domain specific language to the target programming language, or validate the one or more domain specific claims based on the one or more converted domain specific rules.

15. The system of claim 1, wherein the one or more functions comprise assigning a priority, a hierarchy, or an order of execution corresponding to the one or more created or converted domain specific rules.

16. The system of claim 2, wherein the one or more domain specific claims comprise one or more parameter values, wherein the one or more parameter values comprise at least one of a quantity, a frequency, and timing associated with the one or more domain specific parameters respectively.

17. A system for processing one or more domain specific claims, comprising:

a memory;

a network interface communicatively coupled to one or more processing units and the memory, wherein the memory comprises computer instructions that when executed by the one or more processing units cause the system to perform one or more functions, the one or more functions comprising:

creating one or more domain specific rules in a domain specific language based on one or more domain specific regulations;

converting the one or more domain specific rules created from the domain specific language to a target programming language, wherein a selection of the target programming language from a plurality of target programming languages is received via a user interface for the conversion of the one or more domain specific rules;

providing the one or more converted domain specific rules to a claim server via a network, wherein the claim server validates the one or more domain specific claims based on the one or more converted domain specific rules.

18. The system of claim 17, wherein the providing comprises:

generating an executable file comprising the one or more converted domain specific rules; and providing the executable file to the claim server, wherein the claim server executes the executable file to validate the one or more domain specific claims based on the one or more converted domain specific rules.

19. A claim processing system for processing one or more domain specific claims, comprising:

a rule server configured to:

create one or more domain specific rules in a domain specific language based on one or more domain specific regulations; and convert the one or more domain specific rules created from the domain specific language to a target programming language, wherein a selection of the target programming language from a plurality of target programming languages is received via a user interface for the conversion of the one or more domain specific rules; and a claim server configured to:

receive the one or more domain specific claims;

validate the one or more domain specific claims respectively based on the one or more converted domain specific rules of the rule server; and provide a validation result corresponding to the one or more domain specific claims respectively based on the validation.

20. The claim processing system of claim 19, wherein the rule server provides the one or more converted domain specific rules to the claim server and the claim server validates the one or more domain specific claims based on the one or more converted domain specific rules received from the rule server.

21. The claim processing system of claim 19, wherein the claim server provides the one or more domain specific claims to the rule server in order to validate the one or more domain specific claims and the rule server validates the one or more domain specific claims based on the one or more converted domain specific rules respectively.

22. The claim processing system of claim 19, the rule server retrieves or accesses the one or more domain specific claims from the claim server in order to validate the one or more domain specific claims and validates the one or more domain specific claims based on the one or more converted domain specific rules respectively.

23. The claim processing system of claim 19, wherein the rule server retrieves, accesses, or receives the one or more domain specific claims from the claim server in order to validate the one or more domain specific claims, validates the one or more domain specific claims based on the one or more converted domain specific rules, and provides the validation result corresponding to the one or more domain specific claims respectively based on the validation to the claim server and the claim server, in turn, provides the validation result corresponding to the one or more domain specific claims respectively on a user interface.

24. A method for processing one or more domain specific claims, comprising:

creating, via a processor of an electronic device, one or more domain specific rules in a domain specific language based on one or more domain specific regulations;

converting, via the processor, the one or more domain specific rules created from the domain specific language to a target programming language, wherein the converting comprises receiving a selection of the target programming language from a plurality of target programming languages via a user interface for the conversion of the one or more domain specific rules;

accessing, via the processor, the one or more domain specific claims via the network interface or a storage unit;

validating, via the processor, the one or more domain specific claims based on the one or more converted domain specific rules respectively; and providing, via the processor, a validation result corresponding to the one or more domain specific claims respectively based on the validation.

* * * * *